United States Patent [19]

Vetter et al.

[11] Patent Number: 5,602,898
[45] Date of Patent: Feb. 11, 1997

[54] ROTARY-ANODE X-RAY TUBE COMPRISING A SLEEVE BEARING

[75] Inventors: Axel Vetter, Hamburg, Germany; Leo P. M. Tielemans, Eersel, Netherlands

[73] Assignee: U.S. Philips Corporation, New York, N.Y.

[21] Appl. No.: 590,252

[22] Filed: Jan. 23, 1996

[30] Foreign Application Priority Data

Jan. 25, 1995 [DE] Germany .......................... 195 02 207.6

[51] Int. Cl.6 ...................................................... H01J 35/24
[52] U.S. Cl. ............................................. 378/132; 378/133
[58] Field of Search ...................... 378/132, 133, 378/125, 121, 131, 144

[56] References Cited

U.S. PATENT DOCUMENTS

| | | | |
|---|---|---|---|
| 4,798,480 | 1/1989 | Van Beek | 384/114 |
| 5,068,885 | 11/1991 | Vetter | 378/133 |
| 5,504,797 | 4/1996 | Vetter | 378/132 |

*Primary Examiner*—Don Wong
*Attorney, Agent, or Firm*—Jack D. Slobod

[57] ABSTRACT

A rotary-anode X-ray tube, include a sleeve bearing which serves to journal the rotary anode which sleeve bearing has a stationary bearing portion and a bearing portion which is rotatable about an axis of rotation. The two bearing portions cooperate with one another via a lubricant and have bearing surfaces which extend perpendicularly to the axis of rotation in order to take up axial bearing forces. The bearing surfaces changes over into external surfaces which form a lubricant gap between the bearing portions and one of which is provided with a groove pattern. In order to maintain the bearing capacity of this bearing also for forces acting in the axial direction, even under unfavorable operating conditions, the external surface of the rotatable bearing portion which bounds the lubricant gap has a cross-section which is symmetrical with respect to the axis of rotation whereas the cross-section of the external surface of the stationary bearing portion which bounds the lubricant gap is non-symmetrical with respect to the axis of rotation.

14 Claims, 2 Drawing Sheets

5,602,898

ROTARY-ANODE X-RAY TUBE COMPRISING A SLEEVE BEARING

BACKGROUND OF THE INVENTION

1. Field of the Invention

The invention relates to a rotary-anode X-ray tube, comprising a sleeve bearing which serves to journal the rotary anode and comprises a stationary bearing portion and a bearing portion which is rotatable about an axis of rotation, the two bearing portions cooperating with one another via a lubricant and comprising bearing surfaces which extend perpendicularly to the axis of rotation in order to take up axial bearing forces, said bearing surfaces changing over into external surfaces which form a lubricant gap between the bearing portions and one of which is provided with a groove pattern.

2. Description of the Related Art

A rotary-anode X-ray tube of this kind is known from EP-OS 378 273 (=U.S. Pat. No. 5,068,885). The groove pattern is composed of converging grooves. These grooves do not extend linearly, but as lengths of arc of two oppositely directed (logarithmic) spirals; therefore, such a sleeve bearing is also referred to as a spiral-groove bearing. When the bearing rotates in the prescribed direction of rotation, a lubricant pressure is built up at the area in which the pairs of grooves meet, said lubricant pressure determining the bearing capacity of the bearing. The dimension of the cylindrical lubricant gap between the two axial bearings in the known bearing (approximately 0.5 mm) is large in comparison with the distance between the bearing surfaces at the area of the groove pattern (typically 0.02 mm), so that the lubricant gap serves as a lubricant reservoir wherefrom lubricant can be transported to the area of the groove pattern.

It has been found that the bearing capacity of the bearing in respect of axially acting bearing forces may deteriorate after operation for several hours in unfavorable operating conditions.

SUMMARY OF THE INVENTION

It is an object of the present invention to ensure adequate bearing capacity of the sleeve bearing also after prolonged operation in unfavourable operating conditions. In a rotary-anode X-ray tube of the kind set forth this object is achieved in that the external surface of the rotatable bearing portion which bound the lubricant gap has a symmetrical cross-section relative to the axis of rotation, and that the cross-section of the external surface of the stationary bearing portion which bounds the lubricant gap is non-symmetrical relative to the axis of rotation.

A study which has resulted in the invention revealed that the described deterioration of the bearing capacity can occur when the bearing rotates for hours with the axis of rotation in the vertical position and at a high speed (more than 3000 revolutions per minute). This can be explained as follows.

Because of the rotation of the spiral groove bearing, the lubricant is pumped into the area where the spiral grooves meet. When the bearing is appropriately proportioned and the secondary conditions are ideal, this pump effect suffices to transport the lubricant against the effect of the centrifugal forces, to said area of the groove pattern, even in the case of a high speed. However, during operation of such a bearing inevitably instabilities occur which are caused for example by unbalance of the rotary anode which is journalled at one end only. In the case of a vertical axis of rotation, this unbalance may cause a brief change of the hydrodynamic conditions at several point of the bearing so that minimum amounts of lubricant can escape to the lubricant gap. At the outer areas of the bearing faces taking up the axial forces a cavity is then formed in which no lubricant is present. It is not simply possible to transport the lubricant from the lubricant gap to the cavity on the bearing surfaces against the effects of the centrifugal forces.

Even though the centrifugal forces act on the lubricant in the same way in the horizontal position of the axis of rotation, such a cavity does not occur in this position of the axis of rotation because from the lubricant gap the lubricant can reach the area of the groove pattern again under the influence of gravity; this effect is enhanced when the lubricant gap at the upper side of the sleeve bearing becomes a few μm narrower due to the weight of the rotary anode. Therefore, even after operation of the rotary anode with a horizontal axis of rotation for hours, the rotary anode can still operate for some time (approximately one hour) with a vertical axis of rotation without significantly degrading the bearing capacity.

As a result of the construction of the two bearing portions in accordance with the invention it is achieved that, analogously to a hydrodynamic radial sleeve bearing, the lubricant pressure in the lubricant gap increases in the area at which the gap width decreases. As a result, the lubricant is forced out of this area and onto the bearing surfaces which extend perpendicularly to the axis of rotation so as take up the axial bearing forces, the lubricant then reaching the groove pattern again and being pumped into the bearing area. Because the cross-section of the stationary bearing portion is non-symmetrical relative to the axis of rotation, or because the gap cross-section is non-symmetrical relative to the axis of rotation, lubricant is continuously pumped from the lubricant gap to the bearing surfaces. Thus, a lubricant circulation is achieved in which the lubricant travels from the bearing surfaces to the lubricant gap and back to the bearing surfaces again.

It is to be noted that EP-PS 265 005 already discloses a bearing system comprising two hydrodynamic bearings which are arranged at an axial distance from one another and whose bearing surfaces are provided with a groove pattern, between the two bearings there being provided a chamber having mutually perpendicular chamber walls. Therein the cylindrical wall portions are eccentrically arranged relative to one another. As a result, during rotation of the bearing a pressure is built up in the lubricant, the lubricant thus being transported in the bearings which are axially offset relative to one another. The object of the known bearing system is to arrange the two radial bearings as closely to one another as possible. A lubricant circulation is not achieved therein, so that the chamber may have to be refilled with lubricant. A spiral groove bearing taking up axial bearing forces and the problems inherent thereof, to be solved by the invention, are not mentioned in the cited publication.

There are various possibilities for providing the stationary bearing portion with a cross-section which is non-symmetrical relative to the axis of rotation. For example, the external surface may have a circular-cylindrical shape and comprise a nose or ridge extending in the axial direction. Strong turbulences causing unnecessary friction losses could then occur in the lubricant gap. An embodiment in accordance with the invention which is more auractive in this respect consists in that the external surface of the stationary bearing portion which bounds the lubricant gap has a circular cross-section which is eccentric relative to the axis of rotation.

In a further embodiment of the invention, both bearing portions comprise, in addition to a first section which takes up the axial bearing forces, a second section for taking up radial bearing forces, which second section has cylindrical external surfaces which are concentric with the axis of rotation, one of said external surfaces being provided with a groove pattern, the external surfaces of the two sections of the rotatable bearing portion being concentric with one another as well as with the axis of rotation, the external surface of the first section of the stationary bearing portion being eccentric with respect to the external surface of the second section. Thus, whereas the rotatable bearing portion has cylindrical external surfaces which are concentric with respect to one another and with respect to the axis of rotation in both sections, the second section of the second bearing portion has a cylindrical external surface which is concentric with the axis of rotation and the first section has an external surface which is eccentric with respect to the axis of rotation (and also with respect to the cylindrical external surface of the other section).

In the inner part of the groove pattern which is active for the axial bearing forces residual gases which might damage the bearing could collect in the course of operation or during starting up of the X-ray tube if substantial amounts of such residual gases were to occur at this area. The residual gases are drained from this critical area in a further embodiment of the invention in that in the stationary bearing portion there is provided a duct or a system of ducts for connecting the part of the lubricant gap in which a low lubricant pressure occurs during rotation to the inner part of the groove pattern which is active for the axial bearing forces. As a result of this step, but also as a result of other effects, the residual gases can collect at this area of low lubricant pressure. These residual gases can be removed in that the stationary bearing portion is provided with a duct or a system of ducts for connecting the part of the lubricant gap in which a low lubricant pressure occurs during rotation, to the vacuum space of the X-ray tube. The residual gases thus reaching the vacuum space of the X-ray tube can be neutralized by the pumping process during the starting up of the X-ray tube and by a getter during later operation.

In a further embodiment of the invention the stationary bearing portion is provided with a duct, or a system of ducts, for connecting the part of the lubricant gap in which a high lubricant pressure occurs during rotation to the inner part of the groove pattern which is active for the axial bearing forces. This duct, or this system of ducts, provides additional feeding back of the lubricant from the lubricant gap to the bearing surfaces.

These and other aspects of the invention will be apparent from and elucidated with reference to the embodiments described hereinafter.

DETAILED DESCRIPTION OF THE PREFERRED EMBODIMENTS

Figure 1:
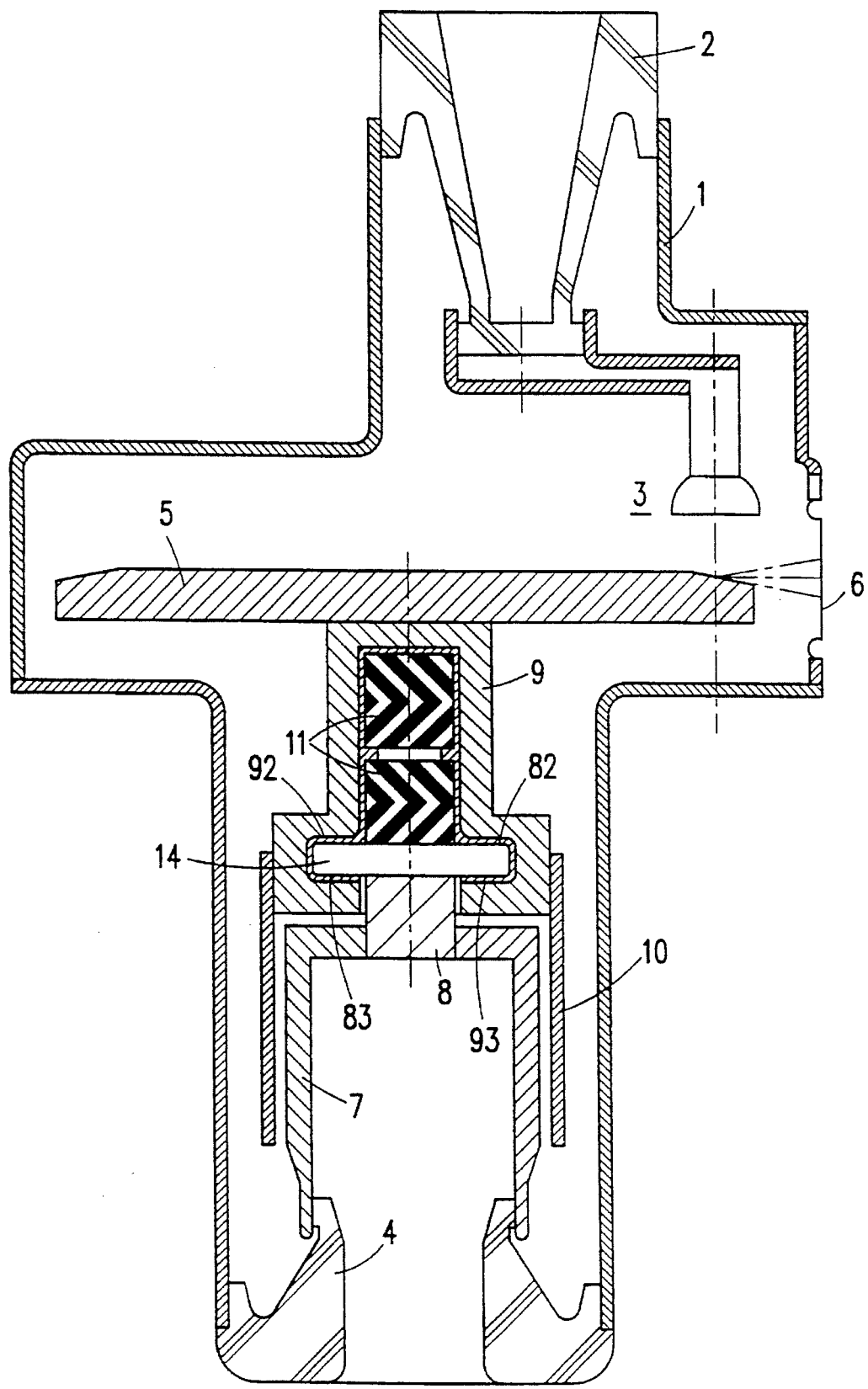
FIG. 1 shows a rotary-anode X-ray tube in which the invention can be used.

The rotary-anode X-ray tube shown in FIG. 1 comprises a metal envelope 1 whereto a cathode 3 is secured via a first insulator and whereto a rotary anode which is rotatable about an axis of rotation 15 is secured via a second insulator 4. The rotary anode comprises an anode disc 5 whose surface facing the cathode 3 generates X-rays when a high voltage is applied. The X-rays can emanate via a preferably beryllium radiation exit window 6 in the envelope. The anode disc 5 is connected, via a bearing system, to a supporting member 7 which is connected to the second insulator 4. The bearing system comprises a bearing shaft 8 which is rigidly connected to the supporting member 7 and also comprises a rotatable bearing portion in the form of a bearing shell 9 which encloses the bearing shaft 8 and the lower end of which accommodates a rotor 10 for driving the anode disc 5 connected to the upper end. The bearing shaft 8 and the bearing shell 9 are made of a molybdenum alloy (TZM). However, instead molybdenum or a tungsten-molybdenum alloy can also be used.

At its upper end the bearing shaft 8 is provided with two axially offset fishbone-like groove patterns 11 for taking up radial bearing forces. The cylindrical gap between the groove patterns 11 and the bearing shell 9 is filled with a liquid lubricant, preferably a gallium alloy. The width of the gap corresponds, for example to the depth of the grooves and may be between 10 µm and 30 µm in practice. When the rotary anode rotates in the prescribed direction, the lubricant is transported to the area of the groove pattern where the grooves pair-wise meet. In the lubricant at this area a pressure is built up which is capable of taking up forces acting radially on the bearing.

Adjacent the area provided with the groove patterns 11 for taking up the radial forces the bearing shaft 8 comprises a section 14 of several millimeters thickness whose diameter is substantially larger than the diameter of the remainder of the bearing shaft 8. Therebelow there is formed a section whose diameter corresponds at least approximately to the diameter of the upper part of the bearing shaft 8 and which is connected to the supporting member 7. The inner contour of the bearing shell 9 is adapted to the section 14. Consequently, at this area the bearing shell 9 must consist of at least two portions which must be connected to one another in such a manner that lubricant cannot escape.

Figure 2A:
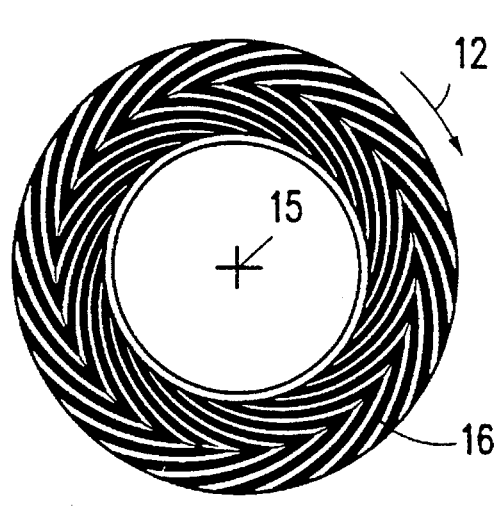
FIG. 2a shows a groove pattern for taking up axial bearing forces.

The free end faces 82, 83 on the upper and on the lower side of the section 14, respectively, or the oppositely situated surfaces 92, 93 of the bearing shell 9, are provided with groove patterns. These groove patterns cooperate with the oppositely situated surfaces in the respective other bearing portion as (spiral groove) bearings for taking up bearing forces acting in the axial direction. FIG. 2a is a plan view of such a groove pattern 16, the arrow 12 indicating the direction in which the bearing shell must rotate so as to have a bearing effect (the indicated direction relates to the case where the groove patterns are provided on the bearing shell 9). However, if the groove patterns are provided on the oppositely situated end face of the section 14 of the bearing shaft 8, the direction of rotation must be reversed). The groove pattern which is concentric with the axis of rotation 15 is composed of successive grooves which converge towards one another. These grooves preferably extend as lengths of arc of two oppositely directed (logarithmic) spirals.

When the rotary anode rotates in the prescribed direction, the lubricant is pumped to the area of the groove pattern where the grooves meet. In the lubricant at that area a pressure is built up which is capable of taking up the forces acting axially on the bearing. A spiral groove bearing of this kind can in principle be proportioned so that the centrifugal forces acting on the lubricant are compensated for and the bearing gap remains filled, even in the vertical position of the axis of rotation and at a high speed. However, in practice local and temporally limited deviations may occur from such optimum conditions, for example due to unbalance and the inherent slight tilting of the bearing portions relative to one another, causing lubricant to escape to the lubricant gap wherefrom, upon continued operation of the bearing with a vertical axis of rotation, it can no longer return to the area of the groove pattern 16 wherefrom it has emerged.

Figure 2B:
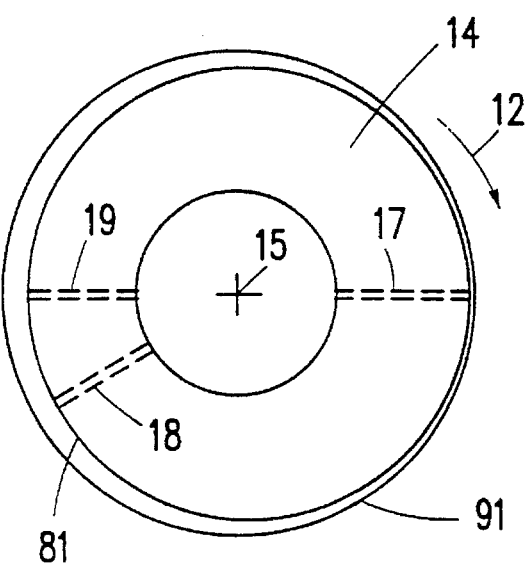
FIG. 2b is a cross-sectional view taken perpendicularly to the axis of rotation.

The section 14 of the stationary bearing portion 8 in accordance with the invention is shaped so that its cylindrical external surface is situated eccentrically with respect to the axis of rotation 15. This is shown in FIG. 2b which is a diagrammatic plan view of the bearing section 14 and which also indicates the inner contour of the bearing shell 9 at this area, as well as in FIG. 3 which shows the two bearing portions in a sectional view containing the axis of rotation 15. The external surface of the section 14 of the bearing shaft is denoted by the reference 81 and the oppositely situated external surface of the bearing shell is denoted by the reference 91. Because the position of the external surface 91 is concentric with the axis of rotation 15 and the position of the bearing surface 81 is eccentric, the width of the lubricant gap between the surfaces 81 and 91 continuously changes along the circumference.

In the area which precedes the narrowest part of this gap in the direction of rotation, a maximum of the lubricant pressure occurs whereas in the oppositely situated area, i.e. the area preceding the area of largest gap width, the lowest lubricant pressure occurs and possibly a cavity is formed in the lubricant. At the area of the highest lubricant pressure the lubricant is forced in the axial direction, so that it penetrates between the bearing surfaces extending perpendicularly to the axis of rotation to both sides of the section 14, so as to reach the area in which the pumping effect of the groove pattern 16 occurs. Thus, notably in the case of a vertical axis and a high speed a lubricant circulation occurs from the bearing surfaces 82, 92 and 83, 93 to the lubricant gap and from the lubricant gap back again between the bearing surfaces, an equilibrium then establishing itself between the inflow and outflow of lubricant.

Figure 3:
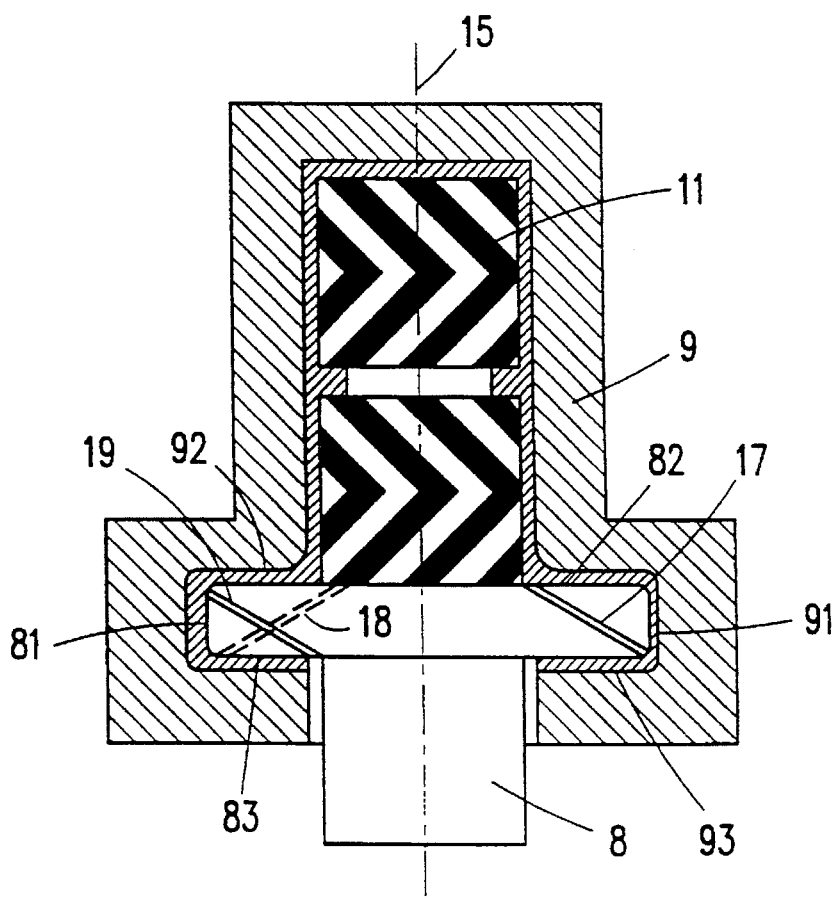
FIG. 3 is a cross-sectional view, containing the axis of rotation, of a sleeve bearing constructed in accordance with the invention.

It is to be noted that the FIGS. 2 and 3 do not show the geometrical relationships to scale, notably not at the lubricant area. The distance between the groove patterns 11 and 16 and the oppositely situated bearing surfaces is between 10 and 30 μm in practice, whereas the distance between the external surfaces 81 and 91 amounts to approximately 0.1 mm at the narrowest area and to approximately 0.9 mm at the widest area. Therefore, the quantity of lubricant in the lubricant gap is substantially larger than that at the area of the groove patterns 11 and 16, so that the lubricant gap can act as a reservoir for the lubricant.

When lubricant has emerged from the bearing, generally speaking from the area of the lower beating surfaces 82, 93, lubricant is transported to the area of the bearing surfaces because of the eccentricity of the gap between the surfaces 81 and 91. Additionally, a duct 17 may be provided to connect, at the area of highest lubricant pressure, the lower part of the lubricant gap to the inner side of the upper end face of the section 14. The diameter of the lubricant duct should be so small that a capillary effect is obtained and the lubricant cannot simply flow out of the duct.

When the bearing is filled with the lubricant in the course of the manufacturing process, but also in the course of normal operation of the bearing, residual gases contained in the lubricant may collect at the areas of lowest lubricant pressure, for example in the transitional zone between the upper axial bearing (82, 92) and the lower radial bearing. If this occurs to a substantial extent, damaging of the bearing surfaces may occur. Such damaging can be prevented by forming a duct 18 which connects this area of the bearing to the part of the lubricant gap in which the lowest lubricant pressure occurs during rotation of the anode disc.

The residual gases can thus reach the lubricant gap. In order to remove the gases from the lubricant at that area there is provided a further duct 19 which connects the lubricant gap at its upper side to the lubricant-free area around the lower end of the bearing shaft, i.e. to the vacuum space of the X-ray tube. The residual gases thus entering the X-ray tube are removed by means of a vacuum pump during the manufacturing process. Should they occur during later operation of the X-ray tube, they are neutralized by the getter provided in the X-ray tube.

The invention is not restricted to the described embodiment. For example, the bearing shell 9 could be connected to the tube envelope 1 instead of to the anode disc 5, and the bearing shaft 8 could be rigidly connected to the anode disc 5 instead of to the tube envelope 1. In that case the bearing shell 9 would be stationary and the bearing shaft 8 would rotate. The external surface 91 should then be eccentric with respect to the axis of rotation 15 and the external surface 81 should be concentric therewith. The ducts 17 . . . 19 should then be provided in the stationary bearing shell. The points shown in FIG. 3 inside and outside the lubricant area, however, cannot be connected by way of a straight duct in the bearing shell. Therefore, instead of a single duct the bearing shell should comprise a duct system consisting of a plurality of intersecting ducts.

We claim:

1. A rotary-anode X-ray tube, comprising a sleeve bearing w serves to journal the rotary anode and which comprises a stationary bearing portion and a bearing portion which is rotatable about an axis of rotation, the two bearing portions cooperating with one another via a lubricant and comprising bearing surfaces which extend perpendicularly to the axis of rotation in order to take up axial bearing forces, said bearing surfaces changing over into external surfaces which form a lubricant gap between the bearing portions and one of which is provided with a groove pattern wherein, the external surface of the rotatable bearing portion which bounds the lubricant gap has a symmetrical cross-section relative to the axis of rotation, and the cross-section of the external surface of the stationary bearing portion which bounds the lubricant gap is non-symmetrical relative to the axis of rotation.

2. A rotary-anode X-ray tube as claimed in claim 1, wherein the external surface of the stationary bearing portion which bounds the lubricant gap has a circular cross-section which is eccentric with respect to the axis of rotation.

3. A rotary-anode X-ray tube as claimed in claim 1, wherein both bearing portions comprise, in addition to a first section which takes up the axial bearing forces, a second section for taking up radial bearing forces, which second section has cylindrical external surfaces which are concentric with the axis of rotation, one of said external surfaces being provided with a groove pattern, the external surfaces of the two sections of the rotatable bearing portion being concentric with one another as well as with the axis of rotation, and the external surface of the first section of the stationary bearing portion being eccentric with respect to the external surface of the second section.

4. A rotary-anode X-ray tube as claimed in claim 1, wherein the stationary bearing portion is provided with a duct, or a system of ducts, for connecting the part of the lubricant gap in which a low lubricant pressure occurs during rotation to the inner part of the groove pattern which is active for the axial bearing forces.

5. A rotary-anode X-ray tube as claimed in claim 1, wherein the stationary bearing portion is provided with a duct, or a system of ducts, for connecting the part of the lubricant gap in which a low lubricant pressure occurs during rotation to the vacuum space of the X-ray tube.

6. A rotary-anode X-ray tube as claimed in claim 2, wherein the stationary bearing portion is provided with a duct, or a system of ducts, for connecting the part of the lubricant gap in which a high lubricant pressure occurs during rotation to the inner part of the groove pattern which is active for the axial bearing forces.

7. A rotary-anode X-ray tube as claimed in claim 2, wherein both bearing portions comprise, in addition to a first section which takes up the axial bearing forces, a second section for taking up radial bearing forces, which second section has cylindrical external surfaces which are concentric with the axis of rotation, one of said external surfaces being provided with a groove pattern, the external surfaces of the two sections of the rotatable bearing portion being concentric with one another as well as with the axis of rotation, and the external surface of the first section of the stationary bearing portion being eccentric with respect to the external surface of the second section.

8. A rotary-anode X-ray tube as claimed in claim 3, wherein the stationary bearing portion is provided with a duct, or a system of ducts, for connecting the part of the lubricant gap in which a low lubricant pressure occurs during rotation to the inner part of the groove pattern which is active for the axial bearing forces.

9. A rotary-anode X-ray tube as claimed in claim 7, wherein the stationary bearing portion is provided with a duct, or a system of ducts, for connecting the part of the lubricant gap in which a low lubricant pressure occurs during rotation to the inner part of the groove pattern which is active for the axial bearing forces.

10. A rotary-anode X-ray tube as claimed in claim 1, wherein the stationary bearing portion is provided with a duct, or a system of ducts, for connecting the part of the lubricant gap in which a low lubricant pressure occurs during rotation to the vacuum space of the X-ray tube.

11. A rotary-anode X-ray tube as claimed in claim 3, wherein the stationary bearing portion is provided with a duct, or a system of ducts, for connecting the part of the lubricant gap in which a low lubricant pressure occurs during rotation to the vacuum space of the X-ray tube.

12. A rotary-anode X-ray tube as claimed in claim 7, wherein the stationary bearing portion is provided with a duct, or a system of ducts, for connecting the part of the lubricant gap in which a low lubricant pressure occurs during rotation to the vacuum space of the X-ray tube.

13. A rotary-anode X-ray tube as claimed in claim 8, wherein the stationary bearing portion is provided with a duct, or a system of ducts, for connecting the part of the lubricant gap in which a low lubricant pressure occurs during rotation to the vacuum space of the X-ray tube.

14. A rotary-anode X-ray tube as claimed in claim 9, wherein the stationary bearing portion is provided with a duct, or a system of ducts, for connecting the part of the lubricant gap in which a low lubricant pressure occurs during rotation to the vacuum space of the X-ray tube.

* * * * *